(12) United States Patent
Tran et al.

(10) Patent No.: US 7,685,634 B2
(45) Date of Patent: Mar. 23, 2010

(54) SYSTEM AND METHOD FOR MANAGING ACCESS TO A STORAGE DRIVE IN A COMPUTER SYSTEM

(75) Inventors: Thao N. Tran, Cedar Park, TX (US); Lowell B. Dennis, Pflugerville, TX (US); Orbie A. Welch, Hutto, TX (US); Peter A. Woytovech, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1066 days.

(21) Appl. No.: 11/034,383

(22) Filed: Jan. 12, 2005

(65) Prior Publication Data
US 2006/0156035 A1    Jul. 13, 2006

(51) Int. Cl.
G06F 12/14 (2006.01)
G06F 7/04 (2006.01)
(52) U.S. Cl. .................................. 726/16; 713/193
(58) Field of Classification Search .................. 726/16; 713/193
See application file for complete search history.

(56) References Cited

U.S. PATENT DOCUMENTS

| 7,103,909 B1* | 9/2006 | Kondo et al. ................ 726/2 |
| 7,240,227 B2* | 7/2007 | Maezawa .................... 713/300 |
| 2003/0120918 A1* | 6/2003 | VanDer Kamp ............ 713/164 |
| 2005/0149508 A1* | 7/2005 | Deshpande ................. 707/3 |

\* cited by examiner

*Primary Examiner*—Kambiz Zand
*Assistant Examiner*—Aubrey H Wyszynski
(74) *Attorney, Agent, or Firm*—Baker Botts L.L.P.

(57) ABSTRACT

A system and method for unlocking storage drives during the transition from a low power state to an operational state in a computer system is disclosed. During initiation of the computer system, a password for each password-protected storage drive is saved to a memory location in the computer system. During the transition from a low power state to an operational power state, the password associated with each password-protected device is retrieved from the memory location on the basis of the unique identifier associated with each storage drive and applied to the storage drive for the purpose of unlocking or making the storage drive accessible.

5 Claims, 5 Drawing Sheets

| DRIVE NO. | SERIAL NO. | PASSWORD |
|---|---|---|
| 1 | ABCXYZ01 | DEF001 |
| 2 | ABCXYZ02 | DEF002 |
| 3 | ABCXYZ03 | DEF003 |
| 4 | ABCXYZ04 | DEF004 |

FIG.3

SYSTEM AND METHOD FOR MANAGING ACCESS TO A STORAGE DRIVE IN A COMPUTER SYSTEM

TECHNICAL FIELD

The present disclosure relates generally to the field of computer systems, and, more particularly, to a system and method for managing access to a storage drive in a computer system.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, may be designed to conform to one or more industry specifications for managing power consumption in a computer system. One of those specifications is the Advanced Configuration and Power Interface (ACPI) specification. The ACPI specification establishes common interfaces and controls for managing power consumption and configuration of a computer system and the devices and components of a computer system. The ACPI specification defines a number of reduced power or sleep states. Depending on the activity of the computer system, the ACPI functionality of the computer system may cause the computer system to enter one of the reduced power or sleep states.

The transition from one of the sleep states to a wake state may require that the computer system reinitiate one or more of the components of the computer system that have been placed in a reduced power state. As an example, when the computer system transitions from an S3 state to a wake state, an unlock command is issued by the BIOS of the computer system with respect to each of the storage drive of the computer system that is password-protected. If the command is repeatedly issued with an incorrect password, whether the password is supplied by a BIOS of the computer system or a user of the computer system, the storage drive will enter a locked state in which it will reject any further security commands until the storage drive is power cycled. Power cycling the storage drive, however, is not supported by the transition from an S3 sleep state to a wake state. Thus, if the storage drives enters a lock state as a result of an excessive number of incorrect password attempts, the computer system will not be able to quickly transition from a sleep state to a wake state. Instead, the computer system will have to be power cycled, thereby reducing or eliminating the advantages associated with being able to quickly and efficiently transition from a sleep state to a wake state.

SUMMARY

In accordance with the present disclosure, a system and method for unlocking storage drives during the transition from a low power state to an operational state in a computer system. During initiation of the computer system, a password for each password-protected storage drive is saved to a non-volatile memory location in the computer system. During the transition from a low power state to a high power state, the password associated with each password-protected device is retrieved from the memory location on the basis of the unique identifier associated with each storage drive and applied to the storage drive for the purpose of unlocking or making the storage drive accessible.

The system and method disclosed herein is technically advantageous because it provides for the transition of a computer system from a low power state to a high power state without the necessity of manually entering each password associated with each storage drive of the computer system. Thus, once a user has successfully entered a password associated with a device, the computer system can transition from a low power state to a high power state without the necessity of reentering the password for each password-protected device of the computer system.

Another technical advantage of the computer system is that it prevents the locking of the devices of the computer system during the transition from a low power state to an operational state. Because the correct password associated with each storage drive is previously saved to non-volatile memory of the computer system, there is not a risk that the routine will repeatedly attempt to unlock a storage drive with an incorrect password during the transition of the computer system from a low power state to a high power state. As such, because each password-protected storage drive can be unlocked quickly and without repeated attempts to unlock the storage drive with an incorrect password, the computer system itself can transition quickly from a low power state to a fully operational state.

Another technical advantage of the system and method disclosed herein is that it may be employed with devices other than storage drives. As such, any device that is password-protected may employ the disclosed invention so that the computer system quickly and efficiently transitions from a low power state to a high power state without compromising the password protections of the device. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a table of identifier and password information for password-protected storage drives of the computer system;

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more storage drives, one or more network ports for communication with external devices as well as various input and output (I/O) devices, such as a keyboard, a mouse, and a video display. The information handling system may also include one or more buses operable to transmit communications between the various hardware components.

Figure 1:
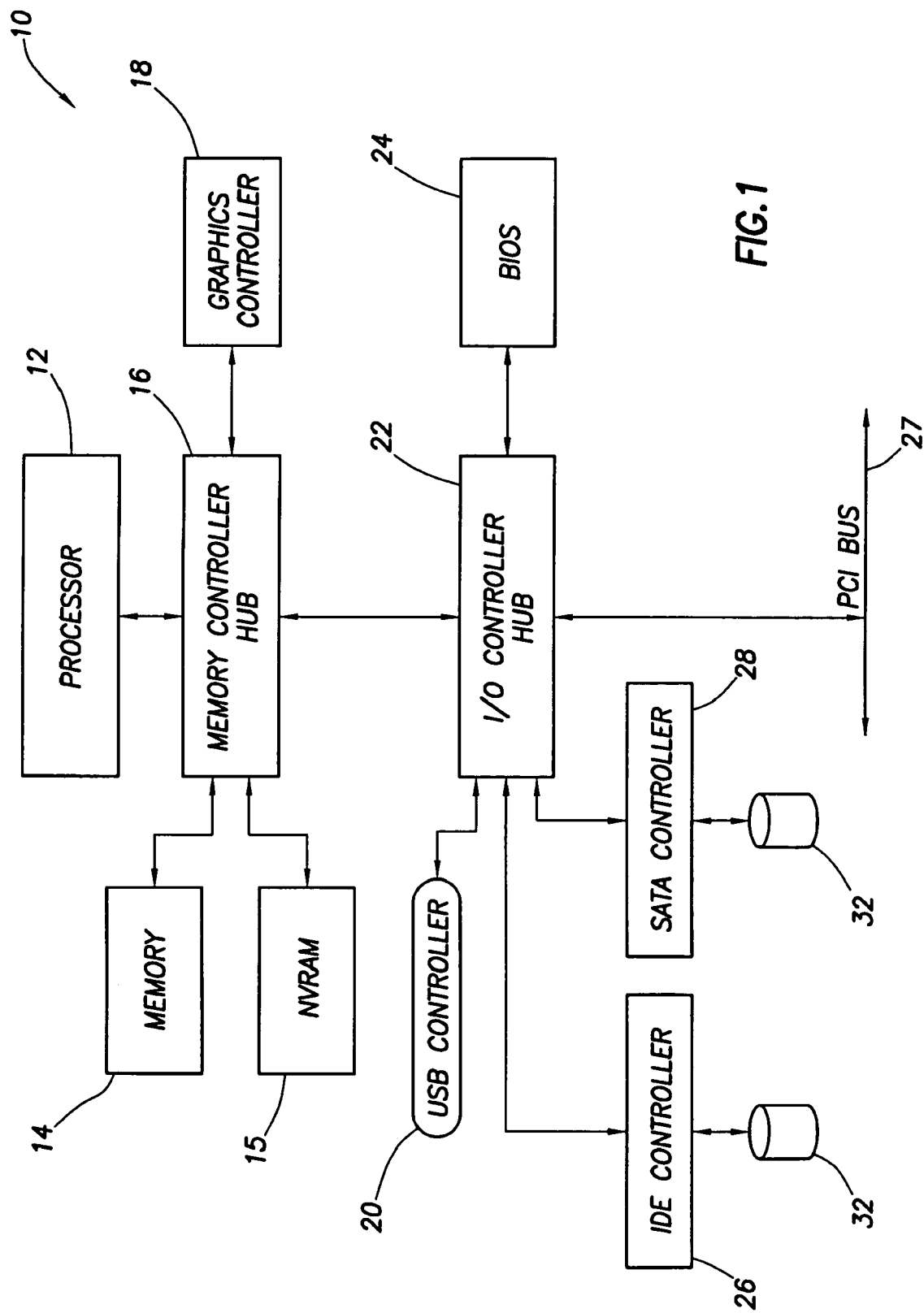
FIG. 1 is a diagram of the architecture of a computer system.

Shown in FIG. 1 is the architecture of a computer system, which is indicated generally at 10. Computer system 10 includes at least one processor 12, which is coupled to a memory controller hub (MCH) 16. Memory controller hub 16 is coupled to a graphics controller 18 and system memory 14. Memory controller hub 16 is additionally coupled to an I/O controller hub (ICH) 22. Coupled to I/O controller hub 22 is a USB controller 20 and a PCI bus. Also coupled to I/O controller hub 22 are controllers for managing the operation and data communication of one or more storage drives of the computer system. In the example of FIG. 1, I/O controller hub 22 is coupled to an IDE controller 26 and a SATA controller 28, each of which are coupled to one or more storage drives 32. A BIOS 24, which may be stored in flash memory, is also coupled to I/O controller hub 22.

In operation, each of the storage drives 32 may be password-protected. To access the contents of the storage drive, the user of the computer system or a software operation of the computer system must enter the correct password in response to a password prompt. Each drive of the system will typically have a unique password. When the computer system attempts to transitions from a low power state to a fully operational state, a password may have to be entered with respect to each password-protected storage drive of the computer system.

Figure 2:
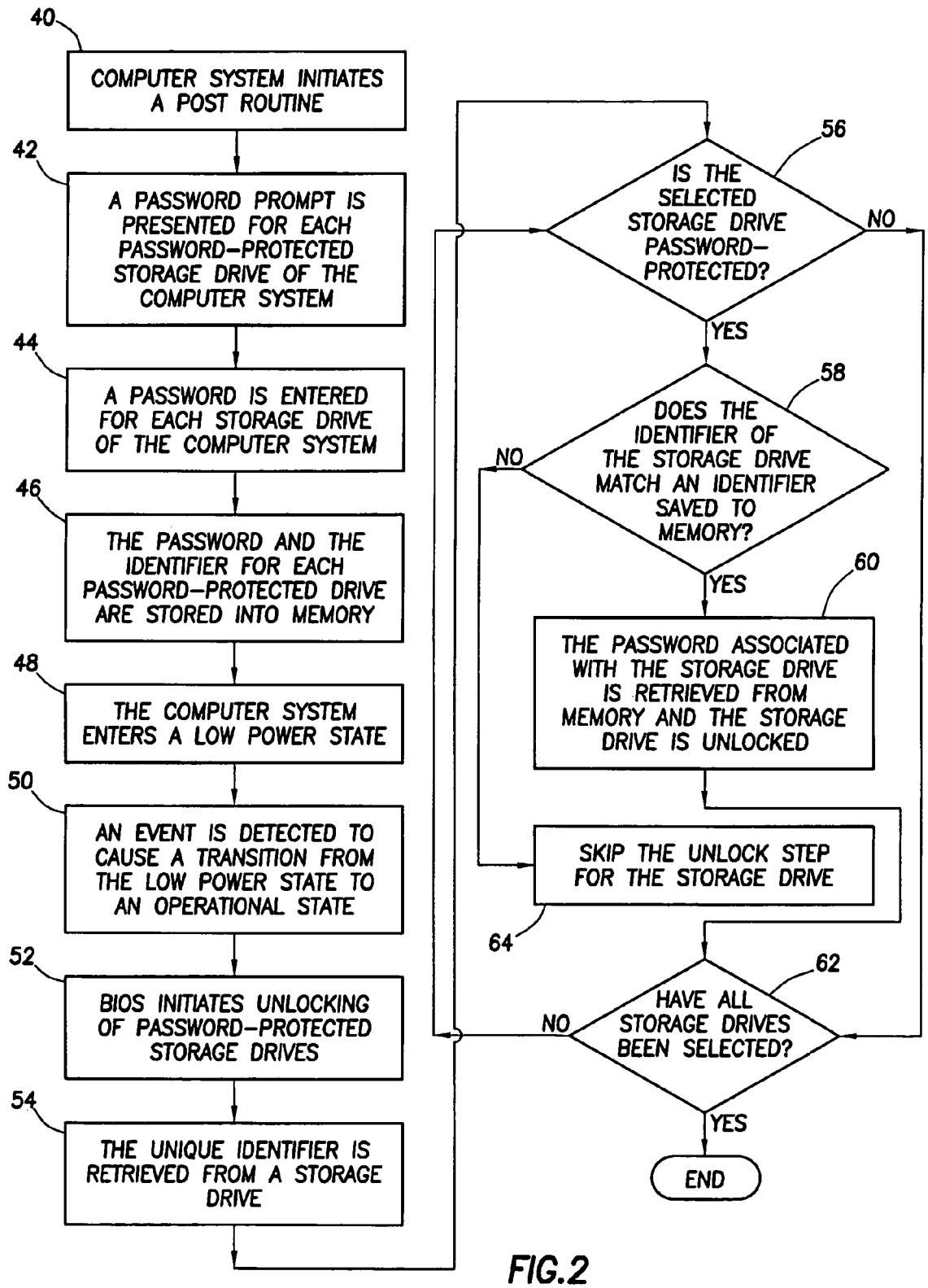
FIG. 2 is a flow diagram of a series of method steps for collecting a password for each password-protected storage drive and unlocking the storage drives during the transition from a low power state.

Shown in FIG. 2 is a flow diagram of a series of method steps for collecting a set of storage drive passwords and executing storage enabling command with those same passwords when the computer system transitions from a low power state to a fully operational state. At step 40 of FIG. 2, the computer system executes its power-on-self-test (POST) routine. As part of the POST routine, each storage drive of the computer system is password enabled. At step 42, a password prompt is executed with respect to each password-protected storage drive of the computer system. At step 44, the password of each storage drive is entered by the user of the computer system. At step 46, the password of each storage drive, together the unique serial number or identifier of each storage drive is saved in table form to a location in non-volatile memory of the computer system. Shown in FIG. 3 is an example of table of storage drive information that is stored in non-volatile memory. For each password-protected storage drive, table 70 includes a number 72 associated with the storage drive, the unique serial number or identifier 74 of each storage drive, and the password 76 of each storage drive. In the example architecture of FIG. 1, table 70 is saved to a location in NVRAM 15.

At step 48, the computer system enters a low power state. At step 50, the ACPI functionality detects an event indicating that the computer system should transition from its low power state to a fully operational state. At step 52, a software routine in the BIOS of the computer system is executed with respect to each storage drive of the computer system. At step 54, the routine polls a selected storage drive of the computer system to retrieve the unique identifier of the storage drive. At step 56, the routine determines if the selected storage drive is password-protected. If it is determined at step 56 that the selected storage drive is password-protected, it is next determined at step 58 if the serial number or unique identifier of the drive matches a drive serial number stored in table 70 in non-volatile memory. If it is determined at step 58 that the serial number of other unique identifier associated with the storage drive is present in the table, the password associated with the serial number is retrieved and the storage drive is unlocked for operation at step 60 with the retrieved serial number. It is next determined at step 62 if the routine has not been executed with respect to all storage drives of the computer system. If additional storage drives remain, the routine continues at step 54 with the selection of another storage drive of the computer system.

If it is determined at step 56 that a selected storage drive is not password-protected, the flow diagram continues at step 62 with a determination of whether the routine has been executed with respect to all storage drives of the computer system. With respect to step 58, if it is determined that the serial number of a selected and password-protected storage drive is not present in table 70, the unlock step is skipped for the selected storage drive (step 64) and processing continues at step 62.

Figure 4:
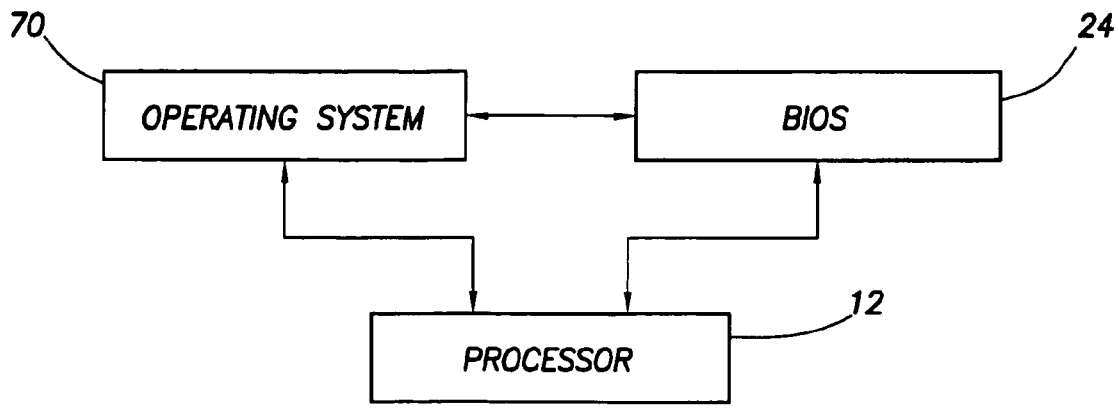
FIG. 4 is a diagram of the logical relationships between the operating system, BIOS, and processor of a computer system.

The unlocking of a hard drive password can also be accomplished through the BIOS of the computer system or through the operating system of the computer system. Shown in FIG. 4 is a diagram of the logical relationships between the operating system 70, BIOS 24, and processor 12 of a computer system. As indicated, the software of each of the operating system 70 and BIOS 24 execute on the processor of the computer system, and the operating system 70 and the BIOS 24 are operable to issue calls or queries to one another. When the computer system transitions from an S3 state or sleep state to a wake state, BIOS 24 can determine if operating system 70 will authenticate the passwords of each of the storage drives of the computer system.

Figure 5:
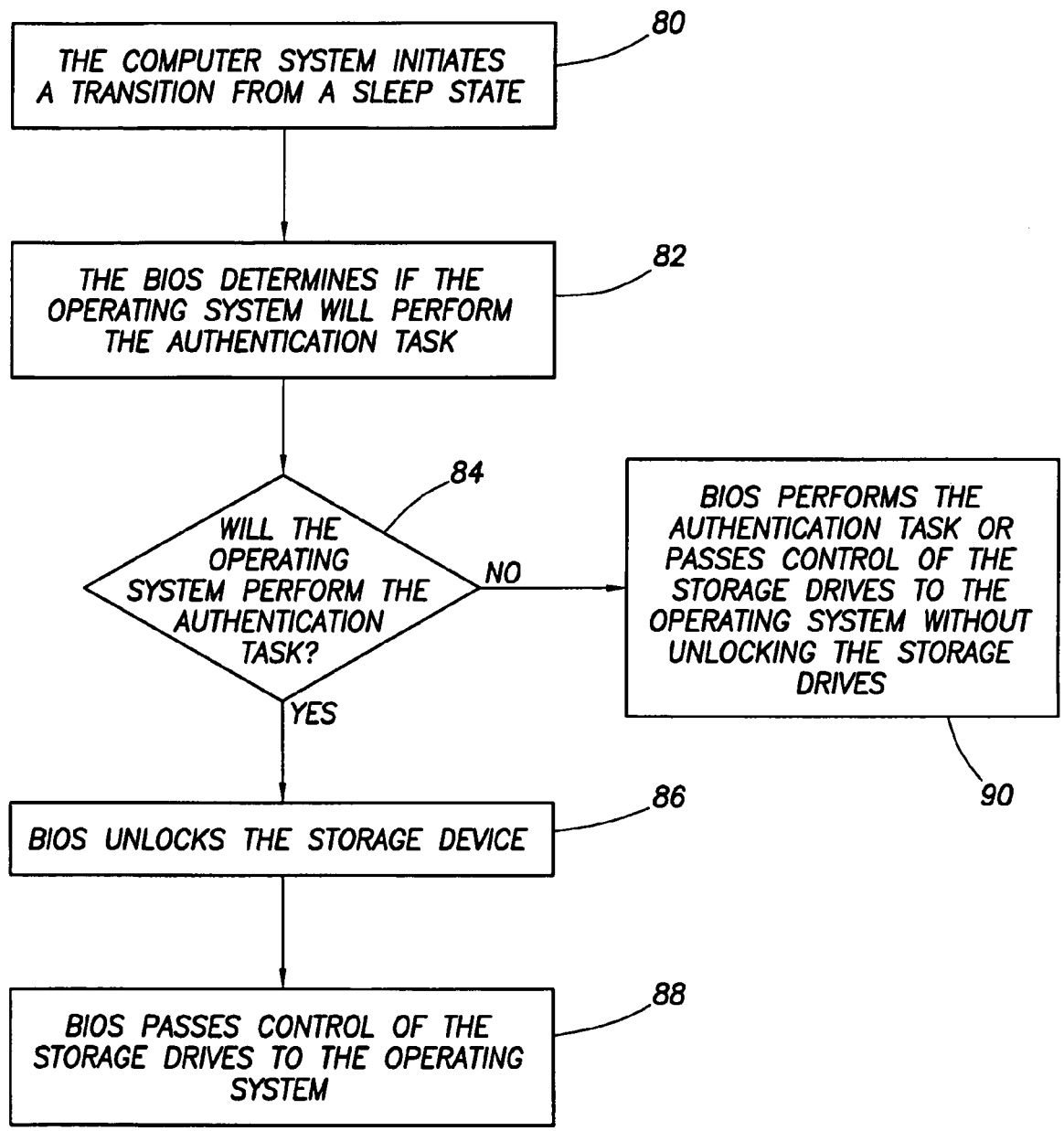
FIG. 5 is a flow diagram of a series of method steps for determining if the operating system will control the authentication of storage drive passwords for the transition of the computer system from a sleep state to a wake state.

Shown in FIG. 5 is a flow diagram of a series of method steps for determining if the operating system will control the authentication of storage drive passwords for the transition of the computer system from a sleep state to a wake state. At step 80, the computer system initiates a resume from its sleep state. At step 82, the BIOS determines if the operating system will perform the authentication task for each of the storage drives of the computer system. The authentication task is the process of authenticating a password to control user access to one or more storage drives of the computer system. The determination of whether the operating system will perform the authentication task can be accomplished by any number of methods, including the reading of a bit previously set by operating system in a storage area or register accessible by both the operating system and the BIOS, or the invoking by the BIOS of a system management interrupt or an ACPI call to the operating system. If it is determined at step 84 that the operating system will perform the authentication task, the BIOS unlocks the storage drives at step 86 and passes control over access to the storage drives to the operating system at step 88. If it is determined at step 84 that the operating system will not perform the authentication task, the BIOS at step 90 will either perform the authentication task for pass control over the storage drives to the operating system without first unlocking the storage drives.

Before transitioning from a wake state to a low power state, the BIOS of the computer system may determine if the operating system will perform the authentication task upon the transition of the computer system from a lower power state to a wake state. As described, some low power states, including the ACPI S3 states, are associated with a loss of power to the storage drives of the computer system. A transition from such a low power state requires that a password be authenticated for each storage drive of the computer system. Other lower power states, however, do not involve the loss power to the storage drives of the computer system and therefore do not require the authentication of each storage drive of the computer system upon the transition from the low power state. As such, if the BIOS recognizes that the operating system will not perform the authentication task upon the transition to a wake state, the computer system can be placed in an S1 state, which does not require password authentication upon transition to a wake state, instead of an S1 state, which does require password authentication upon transition to a wake state.

Figure 6:
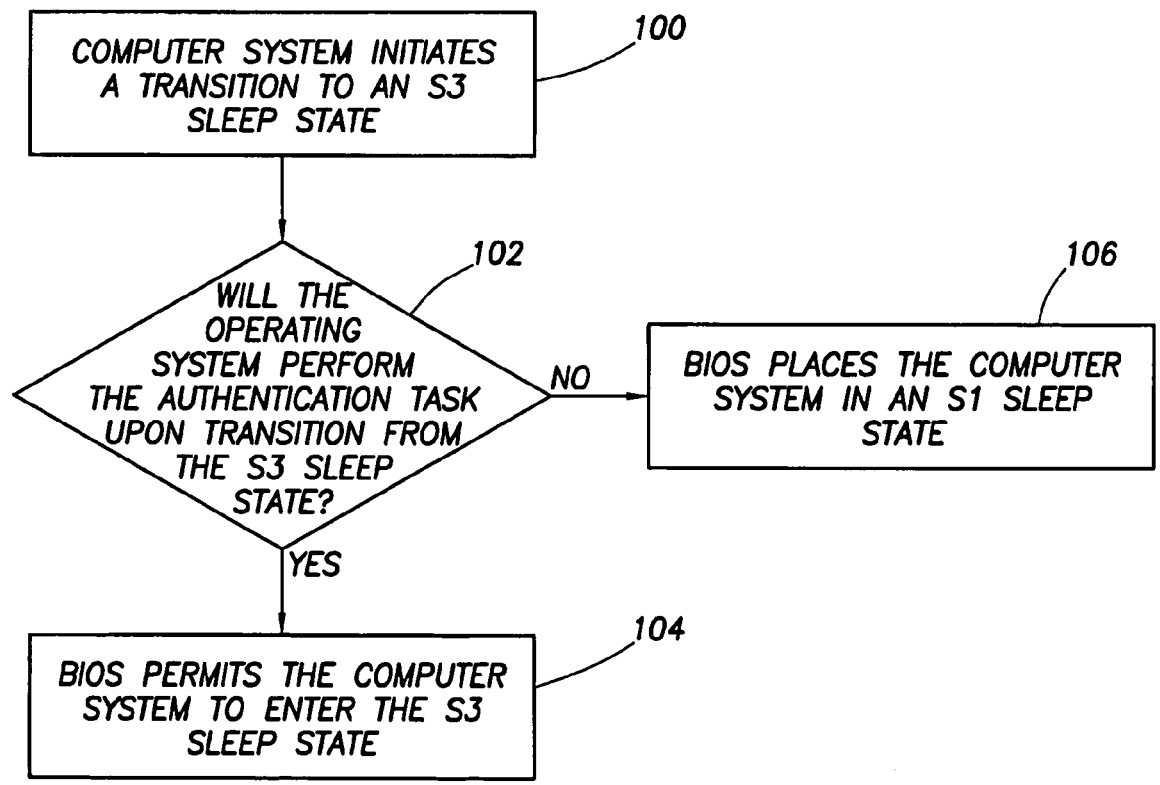
FIG. 6 is a flow diagram of a series of method steps for the selective transition of computer system to one of multiple possible sleep states.

Shown in FIG. 6 is a flow diagram of a series of method steps for the selective transition of computer system to one of multiple possible sleep states. At step 100, a transition to an S3 sleep state is initiated. At step 102, the BIOS determines if the operating system will perform the authentication task upon the transition of the computer system from the S3 sleep state to a wake state. If it is determined at step 102 that the operating system will perform the authentication task upon the transition from an S3 state to a wake state, the BIOS will permit the computer system to enter and S3 sleep state at step 104. If it is determined at step 102 that the operating system will not perform the authentication task upon the transition from an S3 state to a wake state, the BIOS at step 106 will not permit the computer system to enter an S3 state and will instead place the computer system in an S1 sleep state, which does not require the password authentication of each storage drive upon the transition to a wake state.

The method set out herein is advantageous in that permits a computer system to transition from a low power state to a high power state without the necessity of manually entering each password associated with each storage drive of the computer system. Moreover, because the password associated with each storage drive is entered during the POST procedure, the correct password associated with each storage drive is saved to non-volatile memory. Because the correct password for each storage drive is saved to non-volatile memory, there is not a risk that the routine will repeatedly attempt to unlock a storage drive with an incorrect password during the transition of the computer system from a low power state to a high power state. As such, because each password-protected storage drive can be unlocked quickly and without repeated attempts to unlock the storage drive with an incorrect password, the computer system itself can transition quickly from a low power state to a fully operational state.

It should be recognized that the invention described herein is not limited in its application to a computer system having the example architecture disclosed herein. Rather, the invention disclosed herein may be employed in any information handling system in which it is desirable to pre-save the passwords associated with password-protected peripherals or devices of the computer system to enable the transition from a low power state to a fully operational state. It should also be recognized that the invention disclosed herein is not limited in its application to storage drives. The invention disclosed herein may be used to unlock any device of an information handling system that is password-protected. Although the present disclosure has been described in detail, it should be understood that various changes, substitutions, and alterations can be made hereto without departing from the spirit and the scope of the invention as defined by the appended claims.

What is claimed is:

1. A method for transitioning from a wake state to a low power state in a computer system, wherein the computer system includes a password-protected storage drive, comprising:
   identifying a signal to transition from a wake state to a low power state;
   determining whether the operating system of the computer system will control user access to the storage drive upon the transition from the low power state to a wake state;
   if it is determined that the operating system will control user access to the storage drive upon transition from the low power state to the wake state, transitioning the computer system to a first low power state that is associated with password access to the storage drive upon transition from the first low power state to a wake state; and
   if it is determined that the operating system will not control user access to the storage drive upon transition from the low power state to the wake state, transitioning the computer system to a second low power state that is not associated with password access to the storage drive upon transition from the first low power state to a wake state.

2. The method for transitioning from a wake state to a low power state in a computer system, wherein the computer system includes the password-protected storage drive of claim 1, further comprising the step of retrieving from the storage drive a unique identifier associated with the storage drive.

3. The method for transitioning from a wake state to a low power state in a computer system, wherein the computer system includes the password-protected storage drive of claim 2, further comprising the step of retrieving a password for the storage drive from a memory location in the computer system on the basis of the unique identifier associated with the storage drive.

4. The method for transitioning from a wake state to a low power state in a computer system, wherein the computer system includes the password-protected storage drive of claim 3, wherein the step of retrieving a password for the storage drive from the memory location in the computer system on the basis of the unique identifier associated with the storage drive comprises the step of retrieving the password for the storage drive from a non-volatile memory location in the computer system.

5. The method for transitioning from a wake state to a low power state in a computer system, wherein the computer system includes the password-protected storage drive of claim 1, further comprising the step of collecting a password for each storage drive during the initiation of the computer system.

* * * * *